March 14, 1950 K. K. KROGH 2,500,612

IDENTIFICATION DEVICE

Filed Feb. 17, 1948 4 Sheets-Sheet 1

Inventor:
Kenneth K. Krogh
by Emery, Booth, Townsend, Miller and Weidner Attys.

IDENTIFICATION DEVICE

Filed Feb. 17, 1948 4 Sheets-Sheet 2

Inventor:
Kenneth K. Krogh,
by Emery, Booth, Townsend, Miller & Weidner
Attys

March 14, 1950 K. K. KROGH 2,500,612

IDENTIFICATION DEVICE

Filed Feb. 17, 1948 4 Sheets-Sheet 3

Inventor:
Kenneth K. Krogh.
by Emery, Booth, Townsend, Miller and Weidner.
Attys.

Inventor:
Kenneth K. Krogh,
by Emery, Booth, Townsend, Miller and Weidner
Attys

Patented Mar. 14, 1950 2,500,612

UNITED STATES PATENT OFFICE 2,500,612

IDENTIFICATION DEVICE

Kenneth K. Krogh, Sergeant Bluff, Iowa, assignor of one-half to Paul M. Visser, Berkeley, Ill.

Application February 17, 1948, Serial No. 8,972

10 Claims. (Cl. 41—4)

This application is a continuation-in-part of my copending application Ser. No. 650,919, filed February 28, 1946, now abandoned, for an identification device.

This invention relates to a person-identification device adapted for use with or, in certain embodiments of the invention, as a part of a document requiring identification, such as a check, a will, a birth certificate, an insurance policy, a title to land, and mortgages, notes, bonds, etc.

The primary object of the invention is to provide means whereby the owner of any such document may be positively identified, since the means provides for carrying the imprint of the owner's finger print.

Another object of the invention is to provide a simple and inexpensive device which is certain forms thereof may be easily applied to a document requiring identification.

In order that the principle of the invention may be readily understood, I have disclosed several embodiments thereof in the accompanying drawings, wherein—

Fig. 9 is a perspective view of one embodiment of the invention in folded position;

Fig. 10 is a plan view of the said device of Fig. 9 in unfolded position;

Fig. 11 is an edge view thereof;

Fig. 12 is a view showing a finger being applied to the powdered surface of the device;

Fig. 13 is a view showing the same finger being applied to the impression portion of the device;

Fig. 14 is a detailed view showing the removal of the powdered portion of the device;

Fig. 15 is an edge view of the device with the powdered portion removed and the protection portion in position over the impression portion;

Fig. 16 is a plan view of the impression portion after the finger print has been made;

Figures 1, 2, 3, 4, 5, 6, 7, 8:
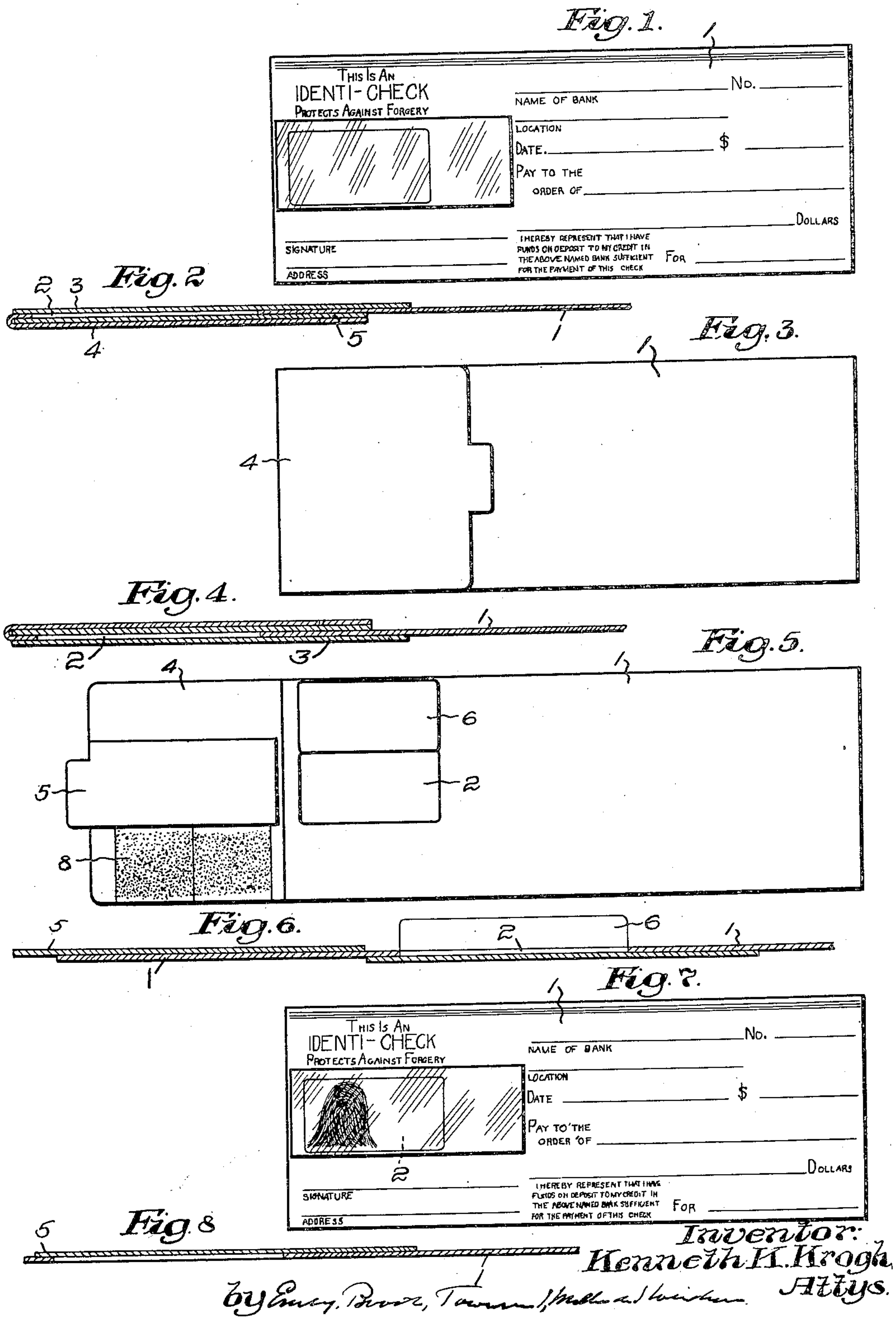
Fig. 1 is a front face or plan view of a check as an article of manufacture and sale having my invention applied thereto and constituting a part thereof and before the identification finger print has been applied.
Fig. 2 is a longitudinal section through the check in the position shown in Fig. 1.
Fig. 3 is a back view of the check shown in Fig. 1.
Fig. 4 is a longitudinal section of the said check in the position shown in Fig. 3.
Fig. 5 is a rear or back view of the check as in Fig. 3 but with the tab opened out and the flap raised.
Fig. 6 is a longitudinal section of the check in the position shown in Fig. 5.
Fig. 7 is a plan or face view of the check shown in Fig. 5, but in its final form after the finger print has been applied and the identification means has been completely positioned.
Fig. 8 is a longitudinal section of the complete check in the position shown in Fig. 7.

Referring first to that embodiment of the invention shown in Figs. 1 to 8 inclusive, wherein my invention is represented as applied to a check termed by me an "Identi-Check," the body of the check is indicated at 1. The said check is provided upon some suitable portion thereof, preferably at the left-hand end viewing Fig. 1, with an opening or "window" 2, desirably of rectangular shape and large enough to display one or two applied finger prints of the person thus identified. Overlying a portion of the end of the check having the opening or window 2 is a small sheet or layer 3 of some pressure-sensitized adhesive or gum material such as scotch tape. The said layer 3 is of merely sufficient area to cover the opening or window 2, and desirably a small area to the right thereof viewing Fig. 1. The said check 1 has as an integral portion thereof a tab 4 which is shown in plan view in Fig. 3. As evident from Figs. 2, 3 and 4, the said tab 4 is of the full height of the check, and it is adapted to be finally torn or otherwise severed from the check. The said tab 4 has applied to the inner face thereof a strip or layer 5 of adhesive or gum material such as scotch tape or other pressure-sensitive adhesive. Thus the front face of the check is itself provided with a layer of scotch tape or other pressure-sensitive adhesive, and the inner face of the tab 4 is also provided with a layer of pressure-sensitive material of suitable area.

I have referred to the opening or window 2. In reality such opening or window is overlaid with some suitable transparent or translucent material such as cellophane, which is the pressure-sensitive adhesive material that receives the finger print. I am not limited to the use of cellophane as any suitable transparent or translucent material may be used.

Referring to Fig. 5, above the opening or window 2 is a flap 6 of the same area as the window, which is an integral portion of the check itself, and which is adapted to be folded down onto the window 2 after the finger print has been placed upon the cellophane or other suitable transparent pressure-sensitive material of the window in the identification process. In Fig. 5 the said flap 6 is represented as elevated, and the tab 4 as opened out from the position shown in Fig. 3. Upon the inner face of the tab 4 there is, as stated, applied the said strip 5 of some material of such nature as to permit the tab to be opened out, without tearing, at the part of the check having the opening or window 2. The said tab 4 below the strip 5 is provided with an area 8 that has been treated with a suitable application that will cause said area 8 to retain powder placed thereon, preferably red powder, for permitting the person who is to be identified to apply the tip of his forefinger thereto and desirably of sufficient area for repeating the operation.

After the person to be identified has applied his forefinger to the powder upon the area 8, he places his powdered finger tip upon the suitable transparent or translucent material covering the opening or window 2, and then the flap 6 is folded down onto the opening or window 2 with its suitable transparent or translucent material and the identification is complete. The powdering of the finger tip and the making of the imprint need not be here illustrated, as these operations are sufficiently illustrated in Figs. 12 and 13.

It will be evident from the foregoing description of that embodiment of my invention shown in Figs. 1 to 8 that Fig. 1 represents a check as an article of manufacture having my invention applied thereto, and that Fig. 7 represents the same check after the finger print has been placed upon the check in accordance with the use of my invention.

It will be evident from the foregoing description that in that embodiment of my invention disclosed in Figs. 1 to 8, there is provided a thin, flexible, person-identification device comprising a basal portion (therein the body of the check) having thereon means for retaining the finger print of a person to be identified, and an auxiliary portion (therein the tab) having means thereon for dusting the finger tip of the person to be identified, said auxiliary portion occupying, prior to use of the device for identification purposes, an overlying position with respect to a face of said basal portion and being separable from said basal portion, said basal portion having also a finger-print protective portion (herein the flap) adapted to be folded onto the said means on the basal portion for retaining the finger print when made, whereby in the use of the device the auxiliary portion may be opened out from the face of the basal portion to disclose for use the said means on the auxiliary portion for dusting the finger tip, and also to expose for use for identification purposes the said means on the basal portion for retaining the finger print, and whereby said retained finger print on the basal portion may be overlaid and thereby protected by the closing thereonto said finger-print protective portion.

Whereas the structure shown in Figs. 1 to 8 is termed by me an Identi-Check, the structures respectively shown in Figs. 9 to 16, 17 to 20 and 21 to 29, are termed by me an Identi-Stamp, inasmuch as the Identi-Stamp is intended to be attached to documents such, for example, as payroll checks, stocks, bonds, wills and other documents wherein positive and readily provable identification is desired.

Referring next to that embodiment of my invention shown in Figs. 9 to 16, which is the exact disclosure in my said pending, allowed application Ser. No. 650,919, the reference numeral 10 designates a strip of suitable transparent tape which is adapted to be secured on the back thereof by adhesive to a check or other document 12 requiring personal identification.

The end portion 14 of the strip 10 is folded onto the strip at 16, and is secured to the strip by adhesive, and the end portion 18 of the strip 10 is folded at 20 upon the strip 10 so that the forward end thereof is adjacent the forward end of the portion 14, and the portion 18 is secured by adhesive to the strip 10 adjacent the fold 20 and intermediate the portion 14 and the fastened end of the portion 18. A coat of paint 21, which may be black, is then applied to the strip 10, and a soft gum substance 22 is applied over the paint 21 on the strip 10.

The inner surface of the portion 18 of the strip 10 is secured by a soft gum to the portion 24 of the strip 26 which has the portion 28 folded at 30 to lie in face-to-face engagement with the portion 24. The strip 26 includes the portions 32 and 34 which are supplied with a powdered material 36, and the portions 32 and 34 are folded at 38 to be in face-to-face contact when folded as shown in Fig. 9.

The strip 26 is provided upon the under surface thereof with soft gum 40 adjacent the fold 38, and the portion 34 is provided with soft gum 42 at the edge of the powdered material 36. The remainder of the portion 34 extending beyond the gum 42 provides a pull portion, as will be later explained.

Figures 9, 10, 11, 12, 13, 14, 15, 16:
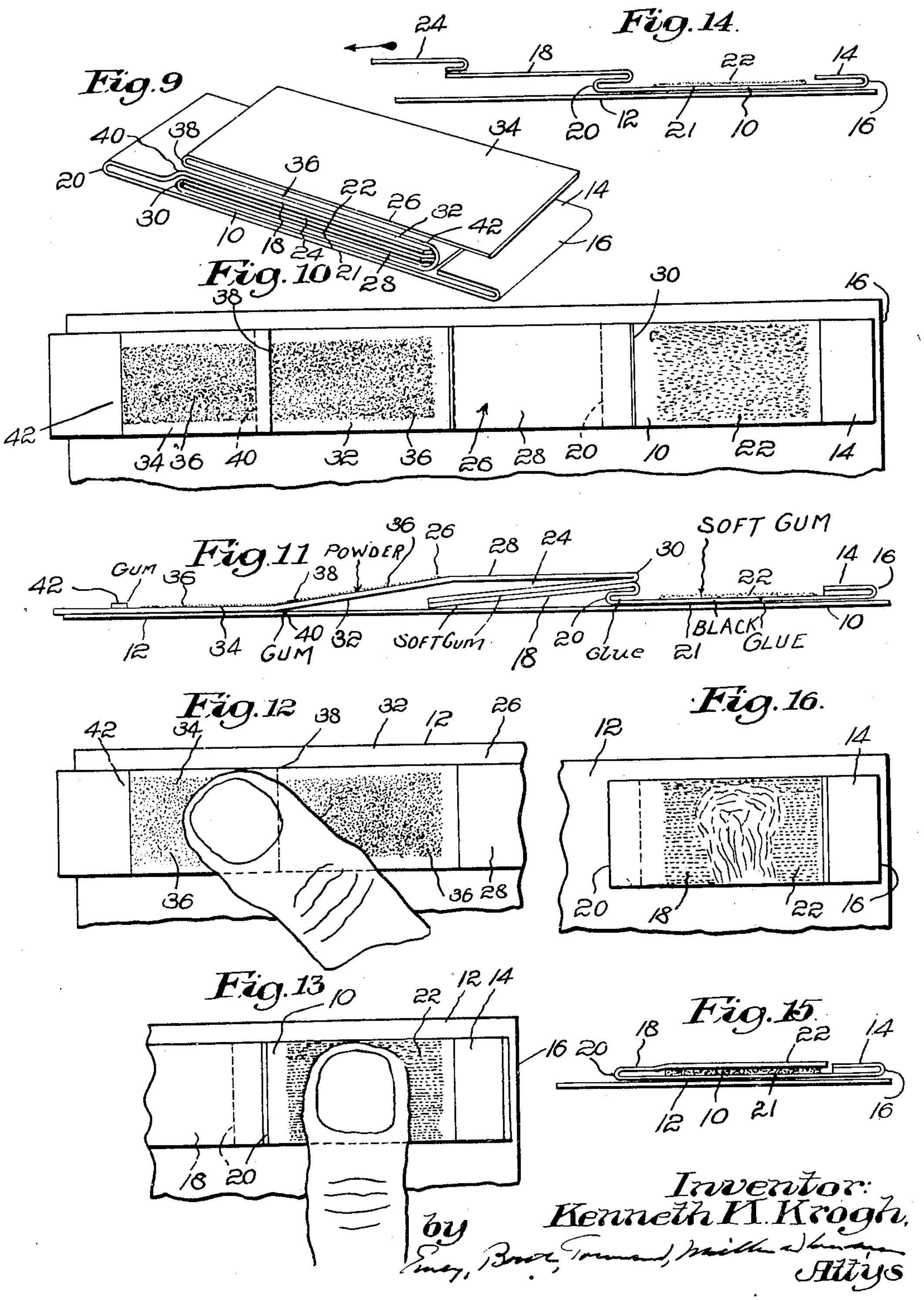
Figs. 9 to 16 are views identical with those shown in the drawing of my said application Ser. No. 650,919, wherein—
Figure 17:
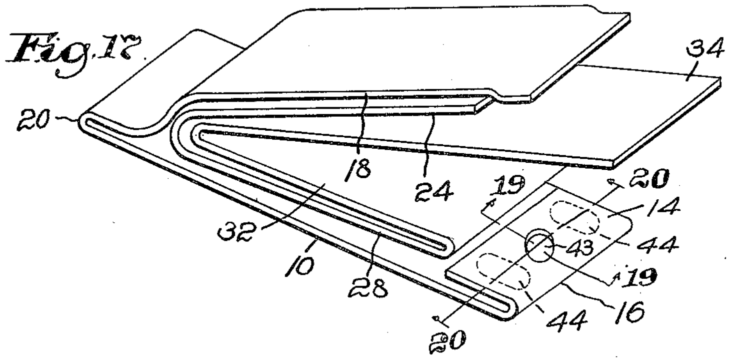
Fig. 17 is a perspective view of another embodiment of my invention constituting a slight variation of the construction shown in Figs. 9 to 16, the structure being shown partially opened out.
Figure 18:
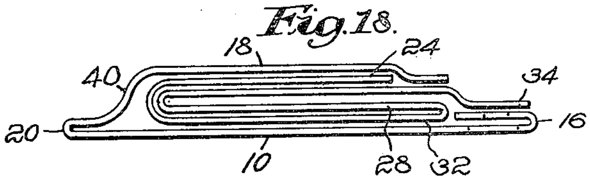
Fig. 18 is a side elevation on a reduced scale of the construction shown in Fig. 17, but in closed position.

In use, the strip 10, as previously stated, is secured by adhesive to the document 12, which may be a check or other document, and the strips 10 and 26 are folded as shown in Fig. 9 along the lines previously described. When it is desired to use the device, it is opened as shown in Fig. 11, and a finger tip or finger tips of the owner of the document is or are applied to the powdered material 36, as shown in Fig. 12, then to the soft gum 22 as shown in Fig. 13, leaving the impression of the finger print in the gum. The black or red background 21 makes the powdered finger print more distinct in contrast to the color of the strip 10 and gum 22. The strip 26 is then separated from the strip 10, as shown in Fig. 14, and the portion 18 of the strip 10 is folded over upon the gum 22, as shown in Figs. 15 and 16, to protect and preserve the print therein, and the strip 26 is discarded.

Thus the device will positively identify the possessor of the document as to whether the possessor is the rightful owner or has the document without the proper right thereto. This will prove valuable when cashing checks, or may be used when it must be ascertained that the possessor of the document is the rightful owner thereof.

Thus, in the embodiment of my invention disclosed in Figs. 9 to 16, there is provided a thin flexible person-identification device comprising a basal portion (herein the strip of suitable transparent tape 10) having thereon means for retaining the finger print of a person to be identified, and an auxiliary portion (herein the strip 26) having means thereon for dusting the finger print of the person to be identified, said auxiliary portion occupying, prior to the use of the device for identification purposes, an overlying position with respect to a face of the said basal portion and being separable from said basal portion, said basal portion having also a finger print protective portion (herein the portion 18 of the strip 10) adapted to be folded onto the said means on the basal portion for retaining the finger print when made, whereby in the use of the device the auxiliary portion may be opened out from the face of the basal portion to expose for use the said means on the auxiliary portion for dusting the finger tip, and also to expose for use for identification purposes the said means on the basal portion for retaining the finger print, and whereby said retained finger print on the basal portion may be overlaid, and thereby protected by the closing thereonto of the said finger print protective portion.

Thus the disclosed second embodiment of my invention shown in Figs. 9 to 16 is a device which is simple and which is distinct from the check or other document, but is applied thereto in use.

Figs. 17 to 20 represent in perspective and in longitudinal and cross sections a variation of that embodiment of my invention shown in Figs. 9 to 16, and in Figs. 17 to 20 the same reference characters as in Figs. 9 to 16 are applied so far as pertinent, and therefore such parts need not be again described.

Whereas, in the construction shown in Figs. 9 to 16, the folded-over end portion 18 of the strip 10 overlaid the portion 24 of the strip 26, but the portions 32 and 34 of the strip 26 were outside of the said end portion 18 of the strip 10, and hence were apt to become ruffled or mussed prior to use, in the construction shown in Figs. 17 to 20 the basal member (namely, the strip 10) has its folded-over portion 18 wholly outside of all the parts of the strip 26, namely, the portions 24, 34, 28, 32 and 34 thereof.

Figure 19:
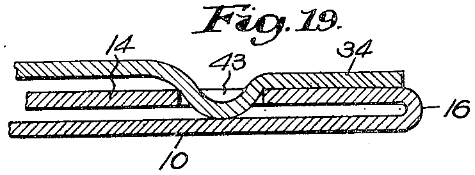
Fig. 19 is an enlarged detail in longitudinal section of a portion of the structure shown at the right hand end in Fig. 17.
Figure 20:
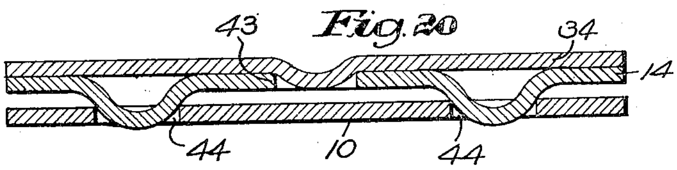
Fig. 20 is an enlarged transverse section on the line 20—20 of Fig. 17.

Moreover, the fold-over end portion 14 of the strip 10 is provided, as shown in Fig. 19, with an opening 43, so that the long end of the portion 34 may be pressed down into the opening 43 so as to adhere to the basal portion 10, and the said strip or basal portion 10 under the folded-over portion 14 is provided, as shown in Fig. 20, with one or more openings 44 into which the gum or other adhesive substance protrudes sufficiently to cause the device to adhere momentarily or as long as desired to the surface of the desk or table upon which the device is being used while making and receiving the finger print.

Figs. 21 to 29 represent still another embodiment of my invention, being an embodiment constituting a variation of the construction shown in Figs. 9 to 16, inasmuch as the device shown in Figs. 21 to 29 is distinct from the check or other document, but is applied thereto in use.

Figures 21, 22, 23, 24, 25, 26, 27, 28, 29:
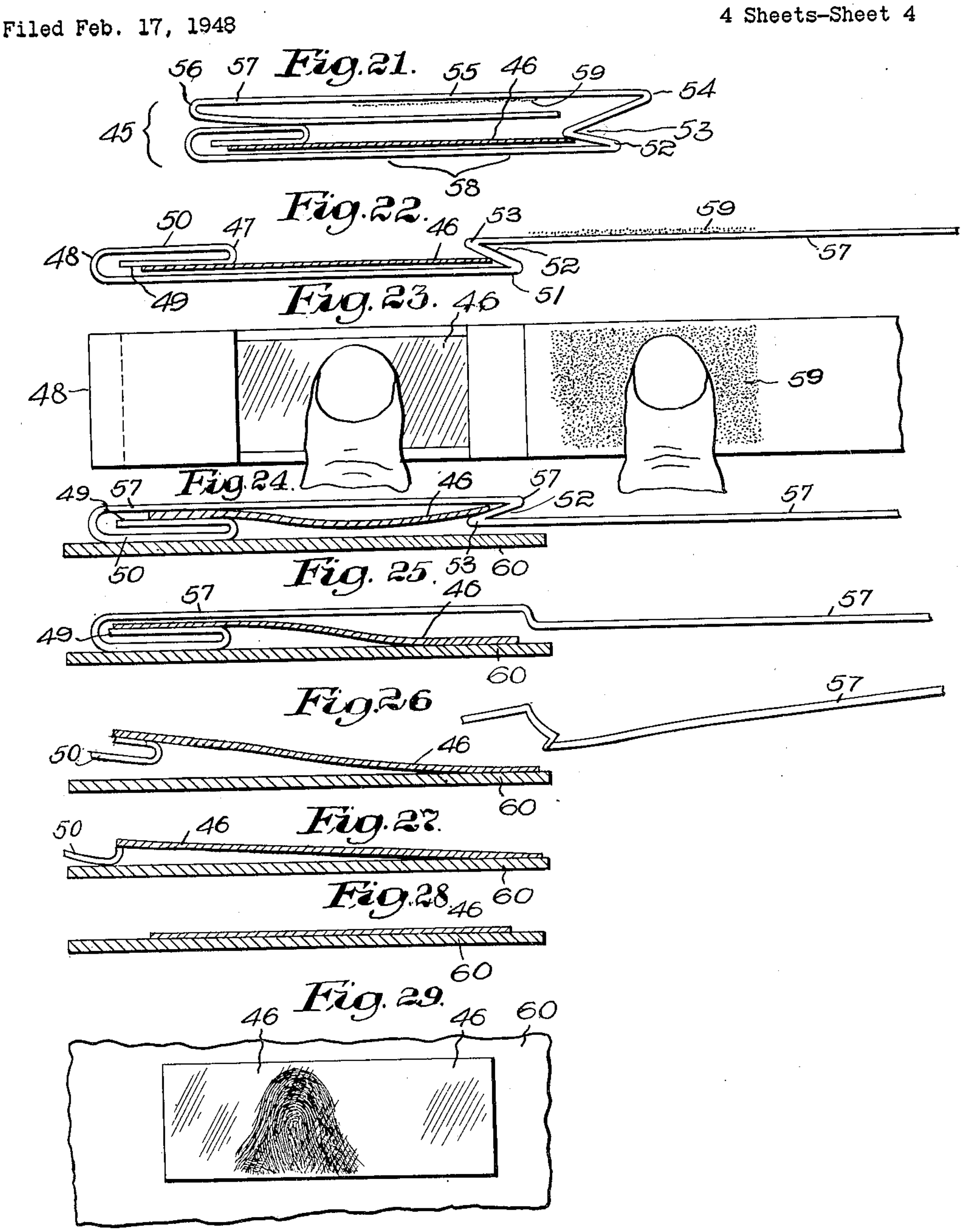
Fig. 21 is a side elevation of still another embodiment of my invention with the parts of the device in closed position.
Fig. 22 is a side elevation with the device partly opened out.
Fig. 23 is a plan view of the device in the condition shown in Fig. 22.
Fig. 24 is a side elevation of the device, but inverted from the position shown in Fig. 22, and positioned so inverted above the receiving face of the check or other document to which the identification is to be applied.
Figs. 25 to 28 are views similar to Fig. 24, but representing further steps in the application of the identification to a check or other document.
Fig. 29 is a plan view of a small portion of a check or other document having the identification applied thereto in accordance with my invention.

In Fig. 21 is represented in folded condition a device consisting of a single folded member of thin, flexible material of fold-retaining nature, desirably paper, generally indicated at 45 in Fig. 21, and a small piece of pressure sensitive adhesive 46 which may be of the same general character and size referred to in the description of the other embodiments of my invention. The said strip 45 is desirably made of rather stiff paper such as two-ply Bristol board, but my invention is not limited to the use of such paper. It is, however, important that the paper or like material be such that it may be folded as herein shown, and that it retain its folded condition until the device is put to its use as a person-identification structure.

As shown in Figs. 21, 22, etc., the left-hand end of the strip 45 is folded twice upon itself along slightly spaced transverse lines 47, 48 to present an inturned end 49 and a portion 50 directly thereabove and represented as slightly spaced, for clearness. At a point sufficiently spaced from the fold 48 the strip 45 is again transversely folded, as indicated at 51, to present a narrow overlying portion 52. The said device is again folded transversely at 53 and again is transversely folded at 54 to present a long portion 55, which is of sufficient length as to be again folded at 56, thus providing an end 57 which is designed to be folded under the portion 55, so as to lie in face-to-face engagement with the adhesive material 46, as shown in Fig. 21. The inturned end 57 of the strip adheres to the adhesive material 46 and thus holds the device closed.

The pressure adhesive material 46 is, in the manufacture of the device, placed upon the upper face of the basal portion 58 of the strip 45 and is held in place beneath the folded under end 49 and the fold 52, as best illustrated in Figs. 21 and 22. The finger dusting powder, which is preferably a red powder and upon which the finger of the user is pressed, is suitably applied, in the manufacture of the device, at substantially the area 59 to that face of the portion 55 of the strip 45 which is the under face in Fig. 21 and becomes the upper face in Fig. 22. Thus when the device is in the folded condition shown in Fig. 21, the powder and the pressure sensitive material are separated from each other by the inturned end 57 of the strip 45.

In order to use the device, the strip is grasped at the folds 56 and 48 which are pulled apart until the strip is opened out into the condition shown in Figs. 22 and 23, thus exposing the pressure sensitive adhesive material and the finger-tip dusting powder. In this condition of the device, the user applies his finger tip to the dusting powder at the area 59, and then makes the impression of his finger tip upon the pressure sensitive adhesive material 46. The device in this condition of partial opening out is inverted over the check or other document 60 to which the pressure sensitive adhesive material with the finger print thereon is to be applied, as represented in Fig. 24.

In Figs. 25 to 28 are represented the further stages in the opening out of the device and the actual presentation of the pressure sensitive adhesive material 46 with the finger print to the check or other document, and in Fig. 29 is represented a broken away portion of the check 60 with the pressure sensitive adhesive material 46 having the finger print thereon, firmly applied to the check.

In each and all of the embodiments of my invention herein disclosed, there is provided a thin, flexible, person-identification device comprising a basal member having a surface capable of receiving and retaining a powdered finger print of a person to be identified and a cooperating auxiliary member having means thereon for dusting the finger tip of the person to be identified, said auxiliary member occupying, prior to using the device for identification purposes, an overlying applied position with respect to a face of said basal member and being separable from said basal member, whereby, in the use of the device, the auxiliary member may be opened out from the face of the basal member to expose for use the said means on the basal member for dusting the finger tip and also to expose for use for identification purposes the said basal member for retaining the finger print.

The underlying purpose of the invention is to provide a complete finger-print kit carrying means for dusting the finger tips and also means for receiving and retaining finger prints through the use of a pressure-sensitive transparent adhesive so designed that the adhesive can be applied to a document (this being characteristic of my Identi-Stamp) or so designed that the adhesive is a part of the document (this being characteristic of my Identi-Check) with the finger print in either case trapped beneath a layer of adhesive in such a way that it stands out in contrast to the coloring of the document to which the adhesive is attached, and in contrast to the clear adhesive member retaining the print.

It will be evident that the auxiliary member, prior to the use of the fingerprint-kit person identifying device occupies an overlying position with respect to a face of the basal member, and thereby protects the powder-bearing surface area from harmful contact with the surface of the basal member and from contact with other foreign objects before the kit or device is opened for use. The said auxiliary member, prior to the use of the kit or device, protects the surface of the basal member from dust and from contact with foreign objects, and also from harmful drying action by the air. The said auxiliary member is entirely separable from the basal member after the use of the kit or device, thereby facilitating discarding of the auxiliary member after its usefulness as a powder-bearing surface area is over. It will be evident that I have provided an article of manufacture which is complete in itself and which constitutes a finger-print kit complete in itself which is a person-identifying device bearing on the surface area thereof the dusting powder. It will also be evident that the said kit or device explicitly and as an essential part of the completely prefabricated kit device bears a retaining powder on a surface area thereof, which powder is thereby rendered instantly available when exposed.

Having thus described several embodiments of the invention, it is to be understood that although specific terms are employed, they are used in a generic and descriptive sense and not for purposes of limitation, the scope of the invention being set forth in the following claims.

I claim:

1. As an article of manufacture complete in itself, a finger-print kit constituting completely in itself a person-identifying device bearing on a surface area thereof a powder for dusting the finger tips and also having means for receiving and retaining finger prints through the use of a pressure-sensitive transparent adhesive that may be applied to a document or is a part of a document, with the finger print trapped beneath a sufficiently transparent adhesive layer constituting an original part of said kit so as to be rendered visible because of the contrast in coloring to the document to which the adhesive is attached and because of the contrast to the clear adhesive member retaining the finger print; said kit comprising a basal member provided with a surface area of pressure-sensitive adhesive capable of receiving and retaining a powdered finger print of a person to be identified, and a cooperating auxiliary member explicitly and as an essential part of the completely prefabricated kit bearing a retaining powder on a surface area thereof, which powder is thereby rendered instantly available when exposed, said construction thereby permitting the person to be identified to apply a finger tip to said powder on said surface area, said auxiliary member occupying, prior to the use of the said kit for identification purposes, an overlying applied position with respect to a face of said basal member and being separable from the said basal member, and thereby protecting the powder-bearing surface area from harmful contact with the said surface of the basal member and from contact with other foreign objects before the kit is opened for use, said auxiliary member also, prior to use of the kit, protecting the surface of the said basal member from dust and from contact with foreign objects and also from harmful drying action of the air, the said auxiliary member being entirely separable from the basal member after use of the kit, thereby facilitating discarding of the auxiliary member after its usefulness as a powder-bearing surface area is over, whereby in the use of the said kit or device, the auxiliary member may be opened out from the face of the basal member to expose for use the said powder that is on said surface area on the auxiliary member for dusting the finger tip, and also to expose for use for identification purposes the said adhesive surface of said basal member, for retaining the finger print.

2. An finger-print kit constituting a person-identifying device in accordance with claim 1, but wherein the basal member is a document that is to receive and retain a finger-print, and thereby rendered identifiable, and wherein the cooperating auxiliary member is a tab constituting a separable extension from and integral with one edge of the basal member and bearing powder upon what is the inner face of said tab before the kit is used.

3. A finger-print kit constituting a person-identifying device in accordance with claim 1, but wherein the basal member is a business check bearing the usual check notations thereon, and which check is to receive and retain a finger print for identification purposes, and wherein the cooperating auxiliary member is a tab constituting a separable but initially integral extension from one end of the said check and bearing the powder upon what is the inner surface of the said tab before the auxiliary member is opened out for using the kit.

4. An finger-print kit constituting a person-identifying device in accordance with claim 1, but wherein the basal member is a business check bearing the usual check notations thereon, and which check is to receive and retain a finger print for identification purposes, and wherein the cooperating auxiliary member is a tab constituting a separable but initially integral extension from one end of the said check and bearing the powder upon what is the inner surface of the said tab before the auxiliary member is opened out for using the kit, the said business check having as a portion thereof a flap that is adapted to be folded down against the face of said check to cover the applied finger-print after the finger-print has been made upon said check.

5. A finger-print kit constituting a person-identifying device in accordance with claim 1, but wherein the basal member and the auxiliary member constitute an article of manufacture that is distinct from the document that is to receive permanently the basal member for identification purposes, said auxiliary member being adapted to be wholly withdrawn from said basal member in the use of the device for identification purposes.

6. A device of the character described comprising a base strip of transparent material, having one end thereof folded upon itself and secured thereto, the other end folded upon itself so that the forward or free end thereof terminates adjacent the opposite folded end of said strip, the fold of said second end being secured to said base, a second strip removably secured to the free end of said strip, said first strip having thereon means for retaining the finger prints of a person and the second strip having means thereon for dusting the finger tips of a person and said first strip adapted to be secured to a document.

7. A finger-print kit constituting a person-identifying device in accordance with claim 1 but wherein the auxiliary member is an elongated strip folded along a plurality of spaced lines normal to the longitudinal axis of the strip, two of said folds being sufficiently adjacent to each other to receive thereunder respectively the opposite ends of said basal member so that the under face of the basal member is received upon the portion of the auxiliary member between said two folds, the said auxiliary member being at another of said spaced lines returned upon itself so as to overlie the upper surface of said basal member.

8. A finger-print kit constituting a person-identifying device in accordance with claim 1 but wherein the person-identifying device is composed of two structurally separate parts which are interfolded together, and which in the use of the device are pulled apart from each other.

9. A finger-print kit constituting a person-identifying device in accordance with claim 1 but wherein the person-identifying device is composed of two structurally separate parts, one of which is entirely folded about the other, and which parts in the use of the device are pulled apart from each other.

10. A finger-print kit constituting a person-identifying device in accordance with claim 1 but wherein the person-identifying device is composed of two structurally separate parts which are interfolded together and which in the use of the device are pulled apart from each other, the said device having an adherent area that in the act of dusting the finger tip and impressing the finger print is received upon the desk or table that supports the said device, so as temporarily to adhere thereto, while so dusting the finger tip and impressing the finger print.

KENNETH K. KROGH.

REFERENCES CITED

The following references are of record in the file of this patent:

UNITED STATES PATENTS

| Number | Name | Date |
|---|---|---|
| 878,366 | Evans | Feb. 4, 1908 |
| 1,099,731 | Adams | June 9, 1914 |
| 1,374,208 | Jones | Apr. 12, 1921 |
| 1,667,542 | Flanagan | Apr. 24, 1928 |
| 2,006,744 | Pierce | July 2, 1935 |
| 2,016,256 | O'Keefe | Oct. 1, 1935 |
| 2,035,768 | Sherman | Mar. 31, 1936 |